(12) United States Patent
Asakawa et al.

(10) Patent No.: US 8,848,148 B2
(45) Date of Patent: Sep. 30, 2014

(54) LIQUID CRYSTAL DISPLAY DEVICE COMPRISING A FIRST ALIGNMENT FILM HAVING AN ALIGNMENT TREATMENT IN A DIRECTION CROSSING A MAJOR AXIS OF A SLIT OF A PIXEL ELECTRODE WHEREIN A LIQUID CRYSTAL LAYER HAS A TRANSITION TEMPERATURE OF 75° C

(75) Inventors: Youichi Asakawa, Nonoichi (JP); Hirofumi Wakemoto, Kanazawa (JP)

(73) Assignee: Japan Display Inc., Tokyo (JP)

( * ) Notice: Subject to any disclaimer, the term of this patent is extended or adjusted under 35 U.S.C. 154(b) by 173 days.

(21) Appl. No.: 13/611,627

(22) Filed: Sep. 12, 2012

(65) Prior Publication Data

US 2013/0100384 A1   Apr. 25, 2013

(30) Foreign Application Priority Data

Oct. 21, 2011  (JP) .................................. 2011-231659

(51) Int. Cl.
*G02F 1/1337* (2006.01)
*G02F 1/1343* (2006.01)
*G02F 1/1335* (2006.01)

(52) U.S. Cl.
CPC .. *G02F 1/1335* (2013.01); *G02F 2001/134372* (2013.01); *G02F 1/1337* (2013.01); *G02F 1/1343* (2013.01); *G02F 1/134363* (2013.01)
USPC .......................................... 349/132; 349/141

(58) Field of Classification Search
USPC .................................. 349/123, 128, 132, 141
See application file for complete search history.

(56) References Cited

U.S. PATENT DOCUMENTS

2010/0165278 A1*  7/2010  Matsumori et al. ........... 349/123

FOREIGN PATENT DOCUMENTS

JP          2002-169184       6/2002
JP          2011-515506 A     5/2011

OTHER PUBLICATIONS

Japanese Office Action issued Aug. 27, 2013 in Patent Application No. 2011-231659 with English Translation.
U.S. Appl. No. 13/905,273, filed May 30, 2013, Asakawa, et al.
U.S. Appl. No. 13/922,413, filed Jun. 20, 2013, Asakawa.

* cited by examiner

*Primary Examiner* — Paul Lee
(74) *Attorney, Agent, or Firm* — Oblon, Spivak, McClelland, Maier & Neustadt, L.L.P.

(57) ABSTRACT

According to one embodiment, a liquid crystal display device includes, a first substrate including a common electrode, a pixel electrode in which a slit facing the common electrode is formed, and a first alignment film, a second substrate including a second alignment film, and a liquid crystal layer which is held between the first alignment film and the second alignment film and is formed of a material having a dielectric constant anisotropy in a range of +3.3 or more to +5.3 or less at a transition temperature of 75° C.

7 Claims, 4 Drawing Sheets

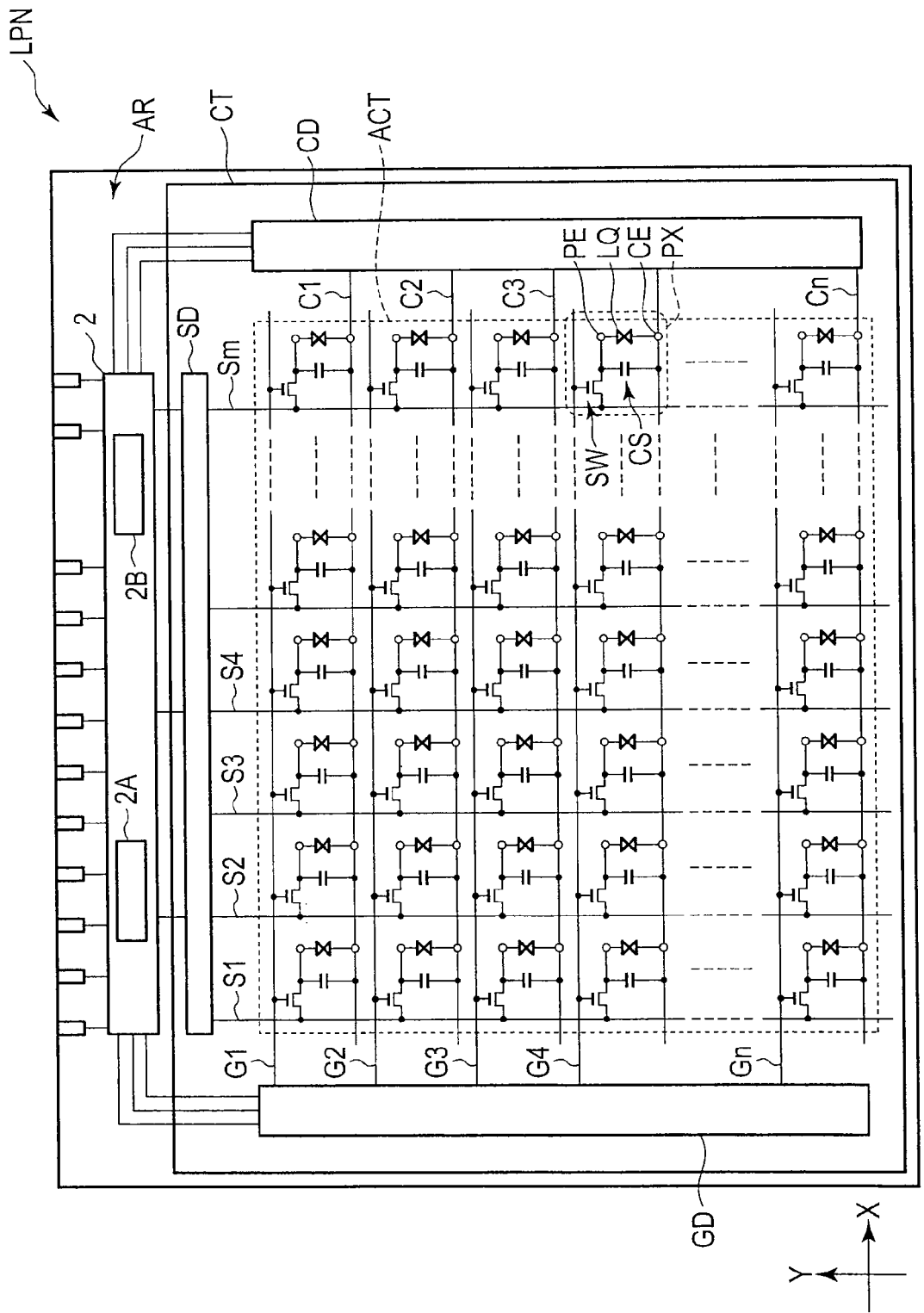
F I G. 1

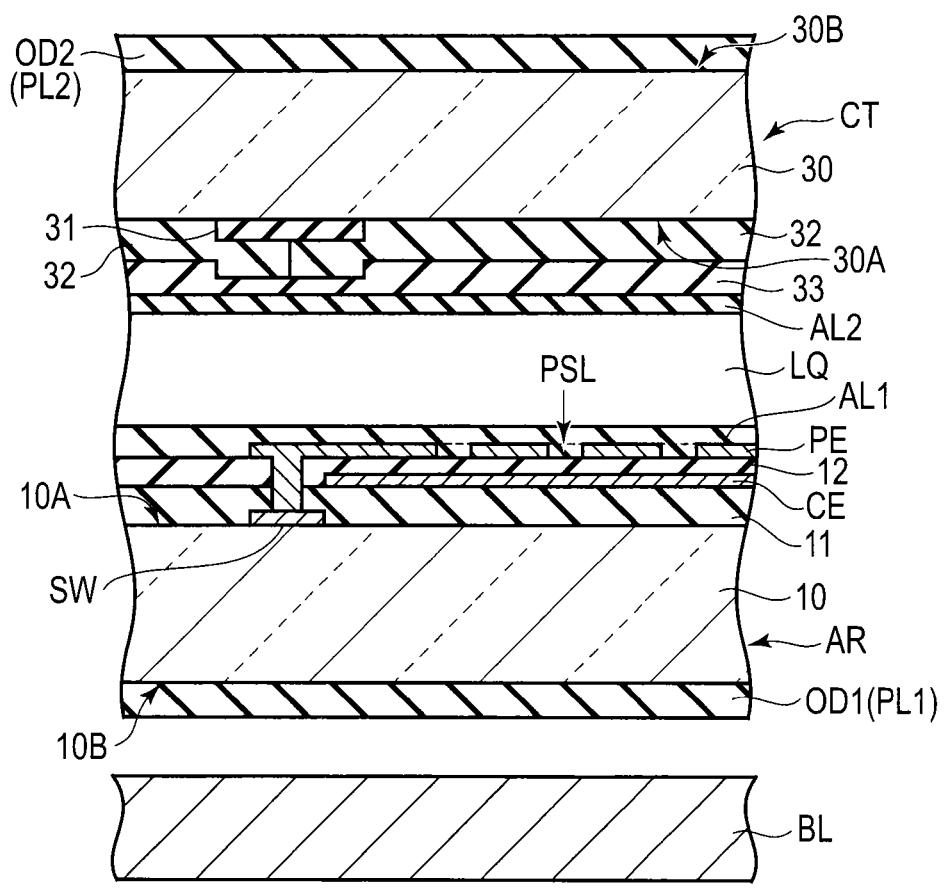
F I G. 2

LIQUID CRYSTAL DISPLAY DEVICE COMPRISING A FIRST ALIGNMENT FILM HAVING AN ALIGNMENT TREATMENT IN A DIRECTION CROSSING A MAJOR AXIS OF A SLIT OF A PIXEL ELECTRODE WHEREIN A LIQUID CRYSTAL LAYER HAS A TRANSITION TEMPERATURE OF 75° C

CROSS-REFERENCE TO RELATED APPLICATIONS

This application is based upon and claims the benefit of priority from Japanese Patent Application No. 2011-231659, filed Oct. 21, 2011, the entire contents of which are incorporated herein by reference.

FIELD

Embodiments described herein relate generally to a liquid crystal display device.

BACKGROUND

By virtue of such advantageous features as light weight, small thickness and low power consumption, liquid crystal display devices have been used in various fields as display devices of OA equipment, such as personal computers, and TVs. In recent years, liquid crystal display devices have also been used as display devices of portable terminal equipment such as mobile phones, car navigation apparatuses, game machines, etc.

In recent years, liquid crystal display panels of a fringe field switching (FFS) mode and in-plane switching (IPS) mode have been put to practical use. The liquid crystal display panel of the FFS mode or IPS mode is configured such that a liquid crystal layer is held between an array substrate, which includes a pixel electrode and a common electrode, and a counter-substrate. In recent years, there has been proposed a liquid crystal display device in which low power consumption is realized by low voltage driving.

BRIEF DESCRIPTION OF THE DRAWINGS

FIG. 1 is a view which schematically illustrates a structure and an equivalent circuit of a liquid crystal display panel which constitutes a liquid crystal display device according to an embodiment.

FIG. 2 is a cross-sectional view which schematically shows a cross-sectional structure of the liquid crystal display panel shown in FIG. 1.

DETAILED DESCRIPTION

Figure 3:
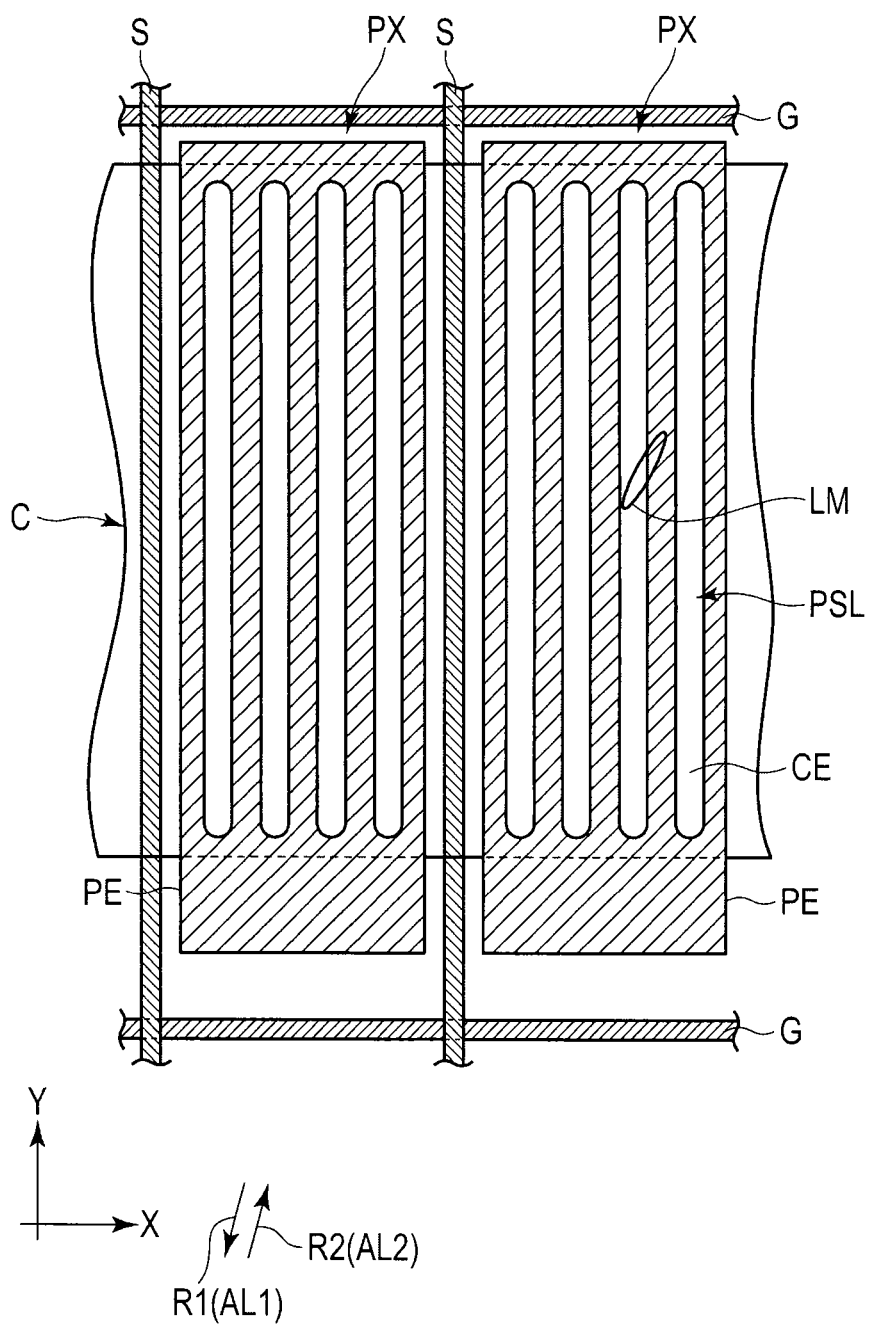
FIG. 3 is a schematic plan view which illustrates a structure of a pixel in an array substrate shown in FIG. 2, as viewed from a counter-substrate side.

In general, according to one embodiment, a liquid crystal display device includes: a first substrate including a switching element disposed in each of pixels, a common electrode formed over a plurality of pixels, an insulation film covering the common electrode, a pixel electrode which is electrically connected to the switching element and is formed on the insulation film in each of the pixels and in which a slit facing the common electrode is formed, and a first alignment film which covers the pixel electrode and is subjected to alignment treatment in a direction crossing a major axis of the slit; a second substrate including a second alignment film which is opposed to the first alignment film and is subjected to alignment treatment in a direction which is parallel to and opposite to the direction of the alignment treatment of the first alignment film; and a liquid crystal layer which is held between the first alignment film of the first substrate and the second alignment film of the second substrate and is formed of a material having a dielectric constant anisotropy in a range of +3.3 or more to +5.3 or less at a transition temperature of 75° C.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display panel LPN which constitutes a liquid crystal display device according to an embodiment.

Specifically, the liquid crystal display device includes a transmissive liquid crystal display panel LPN of an active matrix type. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The array substrate AR includes, in the active area ACT, an n-number of gate lines G (G1 to Gn) and an n-number of capacitance lines C (C1 to Cn), which extend in a first direction X, an m-number of source lines S (S1 to Sm) which extend in a second direction Y crossing the first direction X, a switching element SW which is electrically connected to the gate line G and source line S in each pixel PX, a pixel electrode PE which is electrically connected to the switching element SW in each pixel PX, and a common electrode CE which is a part of the capacitance line C and is opposed to the pixel electrode PE. A storage capacitance CS is formed between the capacitance line C and pixel electrode PE.

The common electrode CE is commonly formed over a plurality of pixels PX. The pixel electrode PE is formed in an island shape in each pixel PX.

Each of the gate lines G is led out to the outside of the active area ACT and is connected to a first driving circuit GD. Each of the source lines S is led out to the outside of the active area ACT and is connected to a second driving circuit SD. Each of the capacitance lines C is led out to the outside of the active area ACT and is connected to a third driving circuit CD. For example, at least parts of the first driving circuit GD, second driving circuit SD and third driving circuit CD are formed on the array substrate AR and are connected to a driving IC chip 2. In addition, the first driving circuit GD, the second driving circuit SD, and the third driving circuit CD function as a driving module for applying a liquid crystal driving voltage between the pixel electrode PE and common electrode CE. In the example illustrated, the driving IC chip 2 is mounted on the array substrate AR, on the outside of the active area ACT of the liquid crystal display panel LPN, as a signal source which is necessary for driving the liquid crystal display panel LPN.

In addition, the liquid crystal display panel LPN of the illustrated example is configured to be applicable to an FFS mode or an IPS mode, and includes the pixel electrode PE and common electrode CE on the array substrate AR. In the liquid crystal display panel LPN with this structure, liquid crystal molecules, which constitute the liquid crystal layer LQ, are switched by mainly using a lateral electric field which is produced between the pixel electrode PE and common electrode CE (e.g. that part of a fringe electric field, which is substantially parallel to a major surface of the substrate).

FIG. 2 is a view which schematically shows a cross-sectional structure of the liquid crystal display panel LPN shown in FIG. 1.

Specifically, the array substrate AR is formed by using a first insulative substrate 10 with light transmissivity, such as a glass substrate. The array substrate AR includes the switching element SW, common electrode CE and pixel electrode PE on an inner surface 10A of the first insulative substrate 10 (i.e. that surface of the first insulative substrate 10, which is opposed to the counter-substrate CT).

The switching element SW illustrated in this example is, for instance, a thin-film transistor (TFT). The switching element SW includes a semiconductor layer which is formed of polysilicon or amorphous silicon. In the meantime, the switching element SW may be of a top gate type or a bottom gate type. The switching element SW is covered with a first insulation film 11.

The common electrode CE is formed on the first insulation film 11. The common electrode CE is covered with a second insulation film 12. The second insulation film 12 is also disposed on the first insulation film 11. The pixel electrode PE is formed on the second insulation film 12. The pixel electrode PE is connected to the switching element SW via a contact hole which penetrates the first insulation film 11 and second insulation film 12. In addition, the pixel electrode PE includes slits PSL which are opposed to the common electrode CE via the insulation film 12. The common electrode CE and pixel electrodes PE are formed of a transparent, electrically conductive material such as indium tin oxide (ITO) or indium zinc oxide (IZO). The pixel electrode PE is covered with a first alignment film AL1. The first alignment film AL1 is formed of a material which exhibits horizontal alignment properties, and is disposed on that surface of the array substrate AR, which is in contact with the liquid crystal layer LQ.

On the other hand, the counter-substrate CT is formed by using a second insulative substrate 30 with light transmissivity, such as a glass substrate. The counter-substrate CT includes a black matrix 31 which partitions pixels PX, color filters 32 and an overcoat layer 33 on an inner surface 30A of the second insulative substrate 30 (i.e. on that side of the second insulative substrate 30, which is opposed to the array substrate AR).

The black matrix 31 is formed on the inner surface 30A of the second insulative substrate 30 so as to be opposed to wiring portions, such as gate lines G, source lines S and switching elements SW, which are provided on the array substrate AR.

The color filters 32 are formed on the inner surface 30A of the second insulative substrate 30, and also extend over the black matrix 31. The color filters 32 are formed of resin materials which are colored in mutually different colors, e.g. three primary colors of red, blue and green. A red color filter, which is formed of a resin material colored in red, is disposed in association with a red pixel. A blue color filter, which is formed of a resin material colored in blue, is disposed in association with a blue pixel. A green color filter, which is formed of a resin material colored in green, is disposed in association with a green pixel. Boundaries between the color filters CF of different colors are located above the black matrix 31.

The overcoat layer 33 covers the color filters 32. The overcoat layer 33 planarizes asperities on the surface of the black matrix 31 and color filters 32. The overcoat layer 33 is formed of a transparent resin material. The overcoat layer 33 is covered with a second alignment film AL2. The second alignment film AL2 is formed of a material which exhibits horizontal alignment properties, and is disposed on that surface of the counter-substrate CT, which is in contact with the liquid crystal layer LQ.

The above-described array substrate AR and counter-substrate CT are disposed such that their first alignment film AL1 and second alignment film AL2 are opposed to each other. In this case, a columnar spacer, which is formed on one of the array substrate AR and counter-substrate CT, creates a predetermined cell gap between the array substrate AR and the counter-substrate CT. The array substrate AR and counter-substrate CT are attached by a sealant in the state in which the cell gap is created therebetween. The liquid crystal layer LQ is composed of a liquid crystal composition including liquid crystal molecules which are sealed in the cell gap created between the first alignment film AL1 of the array substrate AR and the second alignment film AL2 of the counter-substrate CT. In particular, the liquid crystal layer LQ is composed of a liquid crystal material having, for example, a positive (positive-type) dielectric constant anisotropy.

A backlight BL is disposed on the back side of the liquid crystal display panel LPN having the above-described structure. Various modes are applicable to the backlight BL. As the backlight BL, use may be made of either a backlight which utilizes a light-emitting diode (LED) as a light source, or a backlight which utilizes a cold cathode fluorescent lamp (CCFL) as a light source. A description of the detailed structure of the backlight BL is omitted.

A first optical element OD1 including a first polarizer PL1 is disposed on an outer surface of the array substrate AR, that is, an outer surface 10B of the first insulative substrate 10. In addition, a second optical element OD2 including a second polarizer PL2 is disposed on an outer surface of the counter-substrate CT, that is, an outer surface 30B of the second insulative substrate 30. A first polarization axis (or a first absorption axis) of the first polarizer PL1 and a second polarization axis (or a second absorption axis) of the second polarizer PL2 are disposed, for example, in a positional relationship of crossed Nicols.

FIG. 3 is a schematic plan view which illustrates the structure of the pixel PX in the array substrate AR shown in FIG. 2, as viewed from the counter-substrate CT side. FIG. 3 shows only main parts which are necessary for the description.

The gate lines G extend in a first direction X. The gate lines G are disposed with a first pitch along a second direction Y which is perpendicular to the first direction X. The source lines S extend in the second direction Y. The source lines S are disposed with a second pitch, which is less than the first pitch, along the first direction X. A switching element is disposed at an intersection portion between the gate line G and the source line S, but the depiction of the switching element is omitted.

The capacitance line C extends in the first direction X. Specifically, the capacitance line C is disposed in each pixel PX and extends above the source lines S, and is commonly formed over a plurality of pixels PX which neighbor in the first direction X. The capacitance line C includes the common electrode CE which is formed in association with each pixel PX.

The pixel electrode PE of each pixel PX is disposed above the common electrode CE. Each pixel electrode PE is formed in each pixel PX in an island shape corresponding to the pixel shape. In the example illustrated, the pixel electrode PE is formed in a substantially rectangular shape having short sides along the first direction X and long sides along the second direction Y. A plurality of slits PSL, which are opposed to the common electrode CE, are formed in each pixel electrode PE. In the example illustrated, each of the slits PSL extends in the second direction Y and has a major axis which is parallel to the second direction Y.

The first alignment film AL1 and second alignment film AL2 are subjected to alignment treatment (e.g. rubbing treatment or optical alignment treatment) in mutually parallel directions in a plane parallel to substrate major surfaces. The first alignment film AL1 is subjected to alignment treatment in a direction crossing the slit PSL at an acute angle of 45° or less. An alignment treatment direction R1 of the first alignment film AL1 is, for example, a direction which crosses, at an angle of 5° to 15°, the second direction Y in which the slit PSL extends. In addition, the second alignment film AL2 is subjected to alignment treatment in a direction which is parallel to the alignment treatment direction R1 of the first alignment film AL1. The alignment treatment direction R1 of the first alignment film AL1 and an alignment treatment direction R2 of the second alignment film AL2 are opposite to each other.

In the liquid crystal display device having the above-described structure, in a state in which no voltage is applied to the liquid crystal layer LQ, that is, in a state (OFF time) in which no electric field is produced between the pixel electrode PE and common electrode CE, liquid crystal molecules LM included in the liquid crystal layer LQ are aligned in the alignment treatment directions of the first alignment film AL1 and second alignment film AL2 in the plane (the direction in which the liquid crystal molecules LM are initially aligned is referred to as "initial alignment direction").

At the OFF time, part of light from the backlight BL passes through the first polarizer PL1 and enters the liquid crystal display panel LPN. The light, which enters the liquid crystal display panel LPN, is linearly polarized light which is perpendicular to the first absorption axis of the first polarizer PL1. The polarization state of such linearly polarized light hardly varies when the light passes through the liquid crystal display panel LPN at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which a fringe electric field is produced between the pixel electrode PE and common electrode CE, the liquid crystal molecules LM are aligned in a direction different from the initial alignment direction in the plane. In the case of the positive-type liquid crystal material, the liquid crystal molecules LM are aligned in a direction which is substantially parallel to the electric field.

At such ON time, linearly polarized light, which is perpendicular to the first absorption axis of the first polarizer PL1, enters the liquid crystal display panel LPN, and the polarization state of such linearly polarized light varies depending on the alignment state of the liquid crystal molecules LM when the light passes through the liquid crystal layer LQ. Thus, at the ON time, at least part of the light emerging from the liquid crystal layer LQ passes through the second polarizer PL2 (white display).

Next, the relationship between the physical properties of the liquid crystal layer LQ and the driving method in the embodiment is examined.

To begin with, a description is given of the relationship between a liquid crystal driving voltage, which is applied between the pixel electrode PE and common electrode CE, and a transmittance of the liquid crystal display panel LPN.

Figure 4:
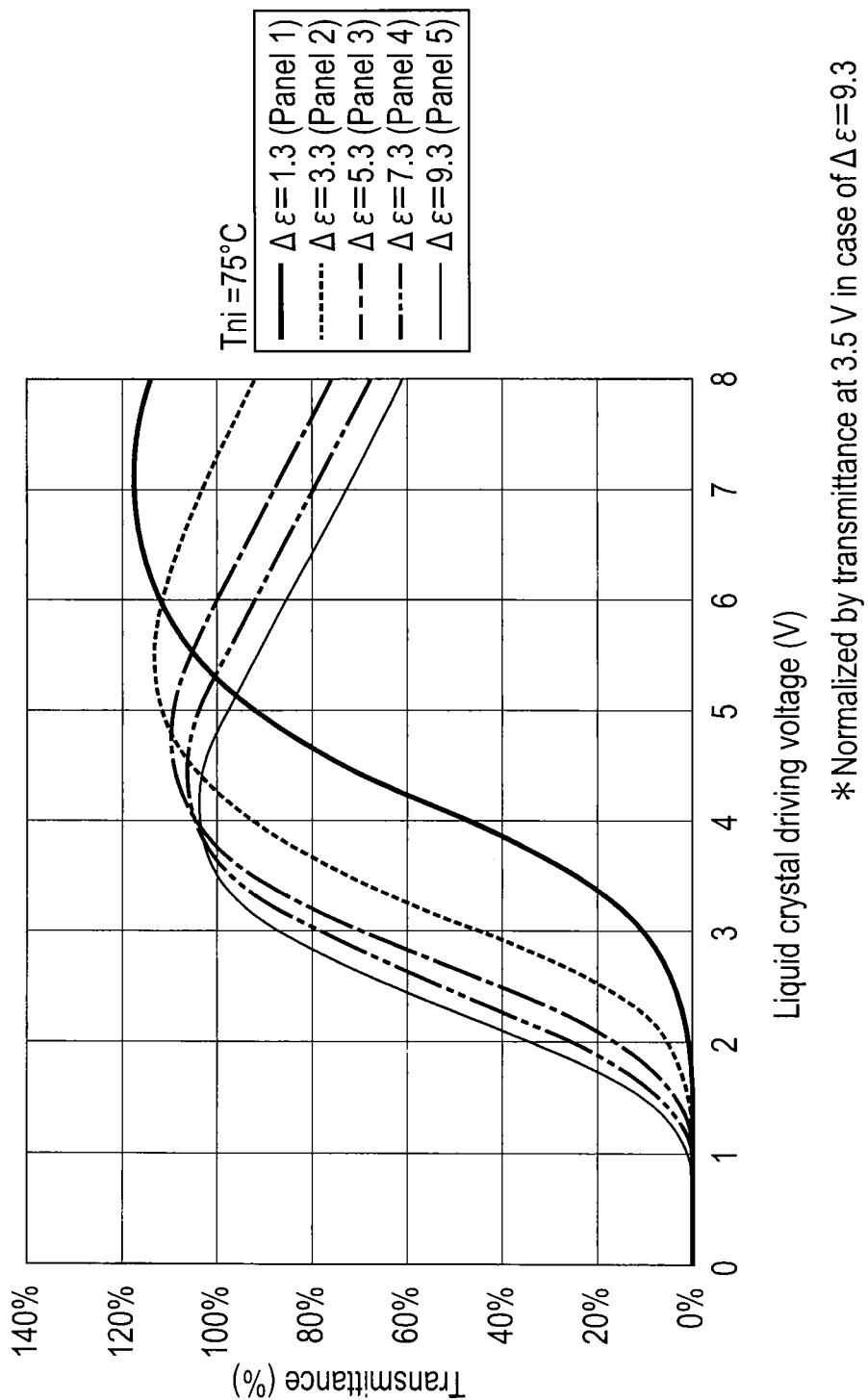
FIG. 4 is a graph showing a relationship between a liquid crystal driving voltage (V) and a transmittance (%)

FIG. 4 is a graph showing a relationship between a liquid crystal driving voltage (V) and a transmittance (%).

In the example illustrated, liquid crystal display panels were prepared, which were composed under the same conditions, except that liquid crystal materials of different conditions of a dielectric constant anisotropy $\Delta\in$ at a transition temperature Tni of 75° C. were applied. The variation of the transmittance in relation to the liquid crystal driving voltage was measured. The prepared liquid crystal display panels are the following five kinds. Panel 1 was composed by applying a liquid crystal material with the dielectric constant anisotropy $\Delta\in$ of 1.3. Panel 2 was composed by applying a liquid crystal material with the dielectric constant anisotropy $\Delta\in$ of 3.3. Panel 3 was composed by applying a liquid crystal material with the dielectric constant anisotropy $\Delta\in$ of 5.3. Panel 4 was composed by applying a liquid crystal material with the dielectric constant anisotropy $\Delta\in$ of 7.3. Panel 5 was composed by applying a liquid crystal material with the dielectric constant anisotropy $\Delta\in$ of 9.3.

The transmittances in FIG. 4 are normalized by setting the transmittance of Panel 5 at 100% at a time when the liquid crystal driving voltage of 3.5 V is applied.

The maximum value of the liquid crystal driving voltage is set at 5 V or less in consideration of the suppression of increase of the load of the driving circuit, the reduction in power consumption, and voltage resistance properties. In this case, the above-described driving module applies a liquid crystal driving voltage in a range of 0 V to 5 V to the liquid crystal layer. In Panel 2 and Panel 3, when the maximum value of the liquid crystal driving voltage is set at 5 V, the transmittances monotonously increase in accordance with the increase of the liquid crystal driving voltage, and the transmittances reach maximum values when the liquid crystal driving voltage in the neighborhood of the maximum value (about 5 V) is applied. At this time, the maximum transmittances obtained in Panel 2 and Panel 3 are increased by about 10%, relative to the transmittance obtained in Panel 5 at a time when the liquid crystal driving voltage of 3.5 V is applied. On the other hand, in Panel 1, the transmittance monotonously increases in accordance with the increase of the liquid crystal driving voltage, but the maximum transmittance obtained in Panel 1 is lower by about 10% than the transmittance obtained in Panel 5 at a time when the liquid crystal driving voltage of 3.5 V is applied. In addition, in Panel 4 and Panel 5, maximum transmittances are obtained when a liquid crystal driving voltage of less than 5 V is applied, but the maximum transmittances obtained in Panel 4 and Panel 5 are lower than the maximum transmittances obtained in Panel 2 and Panel 3.

From the above results, it was confirmed that a high transmittance is obtained in a panel to which a material having a dielectric constant anisotropy $\Delta\in$ in a range of +3.3 or more to +5.3 or less at the transition temperature Tni of 75° C. is applied as a liquid crystal material which constitutes the liquid crystal layer LQ. In addition, it was confirmed that under the condition that the maximum value of the liquid crystal driving voltage is 5 V or less, a highest transmittance is obtained in a panel to which a material having the dielectric constant anisotropy LE in the range of +3.3 or more to +5.3 or less is applied.

In the meantime, based on the following knowledge, the inventor found that the panel transmittance can be improved by applying the liquid crystal material having a low positive dielectric constant anisotropy $\Delta\in$. Specifically, a liquid crystal material with a high dielectric constant anisotropy $\Delta\in$ has a relatively high sensitivity to an electric field, and thus a maximum transmittance is obtained when a relatively low liquid crystal driving voltage is applied. Accordingly, there is a tendency that a liquid crystal driving voltage, with which a maximum transmittance is obtained, becomes higher in a panel to which a liquid crystal material with a lower dielectric constant anisotropy $\Delta\in$ is applied, and this tendency can be perceived from the above measurement results. In addition, the liquid crystal material with a high dielectric constant anisotropy $\Delta\in$ has a relatively high sensitivity to an electric field, liquid crystal molecules, which are initially aligned substantially in parallel to substrate major surfaces, are raised relative to the substrate major surfaces at the time of application of voltage, and a substantial retardation $\Delta n \cdot d$ of the liquid crystal layer LQ lowers. In this case, $\Delta n$ is a refractive index anisotropy of the liquid crystal material, and d corresponds to the cell gap in which the liquid crystal layer is held. Thus, there is a tendency that a maximum transmittance that is obtained becomes lower in a panel to which a liquid crystal material with a higher dielectric constant anisotropy $\Delta\in$ is applied, and this tendency can be perceived from the above measurement results. Based on this knowledge, in the present embodiment, the liquid crystal display panel is formed by applying a material having the dielectric constant anisotropy $\Delta\in$ in the range of +3.3 or more to +5.3 or less.

On the other hand, by applying a liquid crystal material having a low dielectric constant anisotropy $\Delta\in$, it is possible to increase the response speed at a time when a gray scale, which is to be displayed in each pixel, is varied. Specifically, there is a tendency that a liquid crystal material having a lower dielectric constant anisotropy $\Delta\in$ has a lower viscosity coefficient $\gamma 1$ (mPa·s), and there is a tendency that a liquid crystal material having a lower transition temperature Tni has a lower viscosity coefficient $\gamma 1$ (mPa·s). By lowering the viscosity of the liquid crystal material, the response speed can be increased, regardless of the magnitude of the liquid crystal driving voltage.

For example, the viscosity coefficient $\gamma 1$ was 48 mPa·s in a liquid crystal material having a dielectric constant anisotropy $\Delta\in$ of 3.3 at a transition temperature Tni of 75° C. A liquid crystal display panel, to which the liquid crystal material of this condition was applied, corresponds to Panel 2 in FIG. 4. It was confirmed that when this panel was driven by setting the maximum value of the liquid crystal driving voltage at 5 V, a high transmittance was obtained as described above, and the response speed was successfully made higher than in the case in which a negative-type liquid crystal material was applied.

As has been described above, according to the present embodiment, a liquid crystal display device which can enhance the transmittance can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a switching element disposed in each of pixels, a common electrode formed over a plurality of pixels, an insulation film covering the common electrode, a pixel electrode which is electrically connected to the switching element and is formed on the insulation film in each of the pixels and in which a slit facing the common electrode is formed, and a first alignment film which covers the pixel electrode and is subjected to alignment treatment in a direction crossing a major axis of the slit;
a second substrate including a second alignment film which is opposed to the first alignment film and is subjected to alignment treatment in a direction which is parallel to and opposite to the direction of the alignment treatment of the first alignment film; and
a liquid crystal layer which is held between the first alignment film of the first substrate and the second alignment film of the second substrate and is formed of a material having a dielectric constant anisotropy in a range of +3.3 or more to +5.3 or less at a transition temperature of 75° C.

2. The liquid crystal display device of claim 1, further comprising a driving module for applying a liquid crystal driving voltage between the pixel electrode and the common electrode, wherein a maximum value of the liquid crystal driving voltage, which is applied by the driving module, is 5 V or less.

3. The liquid crystal display device of claim 2, wherein a highest transmittance is obtained when the liquid crystal driving voltage of the maximum value is applied by the driving module.

4. The liquid crystal display device of claim 3, wherein the liquid crystal layer is formed of a material having the dielectric constant anisotropy of +3.3 at the transition temperature of 75° C.

5. The liquid crystal display device of claim 4, wherein a viscosity coefficient of the material, of which the liquid crystal layer is formed, is 48 mPa·s.

6. The liquid crystal display device of claim 1, further comprising a first polarizer which is disposed on an outer surface of the first substrate, and a second polarizer which is disposed on an outer surface of the second substrate, wherein a first polarization axis of the first polarizer and a second polarization axis of the second polarizer are perpendicular to each other.

7. The liquid crystal display device of claim 1, wherein the direction of the alignment treatment of the first alignment film crosses the major axis of the slit at an angle of 5° to 15°.

* * * * *